US011283618B1

(12) United States Patent
Griffin et al.

(10) Patent No.: US 11,283,618 B1
(45) Date of Patent: Mar. 22, 2022

(54) TRANSACTION UNIQUE LOYALTY IDENTIFICATION PROGRAMS (TULIP)

(71) Applicant: Wells Fargo Bank, N.A., San Francisco, CA (US)

(72) Inventors: Phillip H. Griffin, Raleigh, NC (US); Jeffrey J. Stapleton, O'Fallon, MO (US)

(73) Assignee: Wells Fargo Bank, N.A., San Francisco, CA (US)

(*) Notice: Subject to any disclaimer, the term of this patent is extended or adjusted under 35 U.S.C. 154(b) by 289 days.

(21) Appl. No.: 16/353,461

(22) Filed: Mar. 14, 2019

(51) Int. Cl.
*H04L 9/32* (2006.01)
*G06Q 30/02* (2012.01)
*H04L 9/08* (2006.01)

(52) U.S. Cl.
CPC ....... *H04L 9/3242* (2013.01); *G06Q 30/0236* (2013.01); *H04L 9/0866* (2013.01)

(58) Field of Classification Search
CPC .... H04L 9/324; H04L 9/0866; G06Q 30/0236
See application file for complete search history.

(56) References Cited

U.S. PATENT DOCUMENTS 10,511,443 B1 * 12/2019 Newman ............... G06Q 20/354
2021/0036856 A1 * 2/2021 Wang ...................... H04L 29/06

FOREIGN PATENT DOCUMENTS

WO   WO-2019045741 A1 * 3/2019 .......... G06F 21/6218

* cited by examiner

*Primary Examiner* — Jeffrey C Pwu
*Assistant Examiner* — Mayasa A. Shaawat
(74) *Attorney, Agent, or Firm* — Foley & Lardner LLP

(57) ABSTRACT

Examples described herein relate to systems, apparatuses, methods, and non-transitory computer-readable media for cryptographically determining a loyalty account identifier, including determining a cryptographic key, determining an input parameter, and generating the loyalty account identifier using a cryptography method based on the cryptographic key and the input parameter. The cryptographic key and the input parameter are inputs to the cryptography method. The loyalty account identifier is an output of the cryptography method.

21 Claims, 2 Drawing Sheets

US 11,283,618 B1

TRANSACTION UNIQUE LOYALTY IDENTIFICATION PROGRAMS (TULIP)

BACKGROUND

Implementations of loyalty programs include linking purchase points with payment methods (e.g., point-of-sale (POS) transactions, digital/online transactions, electronic mobile wallet transactions, and so on). Loyalty programs are typically identified by unique loyalty account identifiers and avoid using the primary account numbers (PANs) of payment accounts (e.g., credit card accounts, debit card accounts, and other suitable payment accounts used to make the purchases) as loyalty account identifiers due to payment card industry (PCI) compliance. Loyalty programs that use identifiers (e.g., a mobile telephone number (MTN)) from one industry (e.g., telecommunications) within the programs of another industry (e.g., PCI) create cross-industry security concerns that put both industries at risk. For example, an MTN obtained through unauthorized access from an application within a telecommunication domain can compromise a middle-ground loyalty program, which in turn can compromise the PAN within the payment domain.

SUMMARY

In some arrangements, a method for cryptographically determining a loyalty account identifier includes determining, by a processing circuit of a device, a cryptographic key, determining, by a processing circuit, an input parameter, and generating, by the processing circuit, the loyalty account identifier using a cryptography method based on the cryptographic key and the input parameter. The cryptographic key and the input parameter are inputs to the cryptography method. The loyalty account identifier is an output of the cryptography method.

In some arrangements, a device configured for cryptographically determining a loyalty account identifier includes a processing circuit comprising a processor and a memory. The processing circuit is configured to determine a cryptographic key, determine an input parameter, and generate the loyalty account identifier using a cryptography method based on the cryptographic key and the input parameter. The cryptographic key and the input parameter are inputs to the cryptography method. The loyalty account identifier is an output of the cryptography method.

In some arrangements, a non-transitory computer-readable medium of a device storing computer-readable instructions such that, when executed, causes a processor of the device to determine a cryptographic key, determine an input parameter, and generate the loyalty account identifier using a cryptography method based on the cryptographic key and the input parameter. The cryptographic key and the input parameter are inputs to the cryptography method. The loyalty account identifier is an output of the cryptography method.

These and other features, together with the organization and manner of operation thereof, will become apparent from the following detailed description when taken in conjunction with the accompanying drawings.

DETAILED DESCRIPTION

Referring generally to the FIGS., arrangements described herein relate to systems, apparatuses, methods, and non-transitory computer-readable media for generating a loyalty account identifier. For example, obfuscation of identifiers that link purchase points with payment methods (e.g., point-of-sale (POS) transactions, digital/online transactions, mobile wallet transactions, and so on) is used to generate the loyalty account identifier. In some examples, a random number is used as a salt and combined with one or more industry identifiers using cryptography methods. In cryptography, a salt is an additional input to a one-way hash function for improved security. Examples of the cryptography methods include but are not limited to, a keyed-hash message authentication code (HMAC), a message authentication code (MAC), and so on.

Conventionally, loyalty points are issued by linking a loyalty account (identified by a loyalty account identifier such as a loyalty account number) to a PAN (e.g., a credit card number), such that every time a transaction is processed using the PAN, a designated amount of loyalty points or rewards are issued to the loyalty account. Some conventional POS systems require phone numbers or mobile applications in order to issue loyalty points to a customer at check-out. For example, such a conventional POS system associates a MTN of a customer with a loyalty account of the customer. The MTN is inputted by the customer via an input device (e.g., a keypad) of the POS system (e.g., a POS terminal). The association or linkage of the MTNs with loyalty accounts creates cross-industry security concerns given that if (when) the storage entity that stores the loyalty accounts and associated MTNs is hacked, the MTNs (e.g., from the telecommunications industry) are also at risk, in addition to financial information (e.g., from the PCI).

Figure 1:
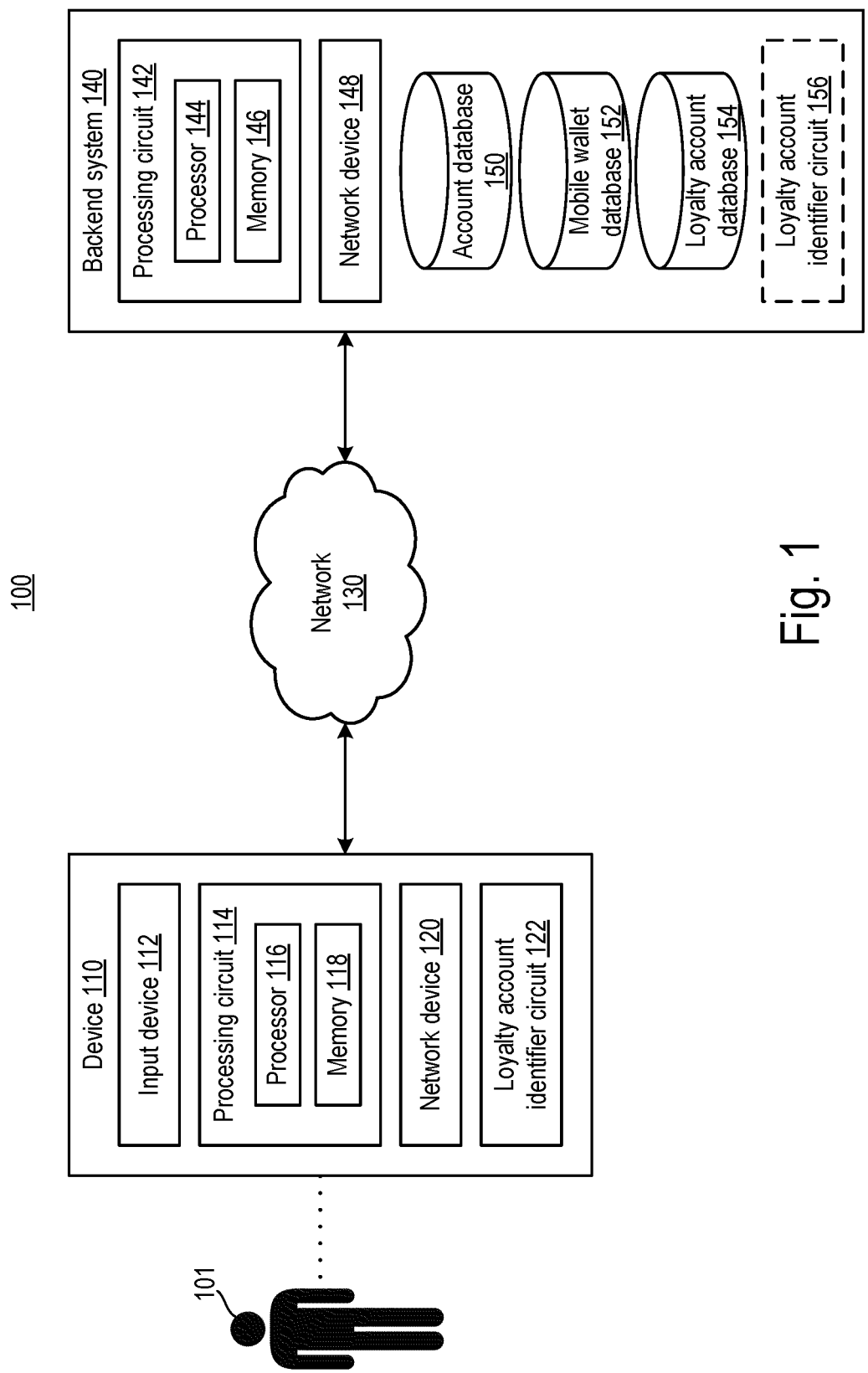
FIG. 1 is a diagram of a system for cryptographically determining a loyalty account identifier, according to some arrangements.

FIG. 1 is a diagram of a system 100 for cryptographically determining a loyalty account identifier, according to some arrangements. Referring to FIG. 1, the system 100 includes at least a device 110 and a backend system 140. Each of the device 110 and the backend system 140 is a computing system having suitable processing, storage, and networking capabilities. In some arrangements, the backend system 140 can be connected to the device 110 via a network 130 as shown. Generally, in the system 100, the device 110 or the backend system 140 can be configured to determine the loyalty account identifier in the manner described.

The device 110 is connected to the backend system 140 via a network 130. The network 130 is any suitable Local Area Network (LAN) or Wide Area Network (WAN). For example, the network 130 can be supported by Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS) Wideband Code Division Multiple Access (WCDMA), Long Term Evolution (LTE), evolved Multimedia Broadcast Multicast Services (eMBMS), High-Speed Downlink Packet Access (HSDPA), and the like), Universal Terrestrial Radio Access (UTRA), Global System for Mobile Communications (GSM), Code Division Multiple Access 1× Radio Transmission Technology (1×), General Packet Radio Service (GPRS), Personal Communications Service (PCS), 802.11X, ZigBee, Bluetooth®, Wi-Fi, any suitable wired network, combination thereof, and/or the like. The network 130 is structured to permit the exchange of data, values, instructions, messages, and the like between the device 110 and the backend system 140.

The device 110 can be any suitable device configured to process a transaction of a customer 101. In some arrangements, the device 110 can be a merchant device configured to receive customer information associated with the transaction. The transaction is an electronic transaction in which the purchase of goods/services by the customer 101 is performed over one or more computer networks. Examples of the device 110 include but are not limited to, a mobile device, a smartphone, a laptop computer, a tablet, a desktop computer, an Automatic Teller Machine (ATM), and the like. In some examples, the device 110 can be located at a merchant location and is configured to process transactions of customers (including the customer 101) of that merchant. The device 110 can provide suitable security protocols and secure sessions. For example, the device 110 can be a merchant POS terminal, a merchant eCommerce host, and so on.

In the examples in which the device 110 is a merchant POS terminal, the device 110 is configured to receive customer information via an input device 112. In some examples, the input device 112 is a card reader configured to read a payment card (e.g., a credit card, a debit card, a gift card, a prepaid card, and so on). The payment card can a physical card. Accordingly, the payment card can provide account information (e.g., a PAN, an "Europay, Mastercard and Visa" (EMV®) token, and so on) of a payment account of the customer 101 to the device 110 during a transaction between the merchant and the customer 101. The input device 110 is configured to read the account information from the payment card by reading, for example, an encoded magnetic stripe, an embedded smart chip (e.g., an EMV® chip), an embedded near-field communication (NFC) tag, QR code, or the like. For example, the customer 101 can swipe, insert, scan, or tap the payment card at the input device 112 of the device 110 during an in-person transaction at a location of the merchant. In that regard, the input device 112 includes one or more of a magnetic stripe reader, a chip reader, a NFC communication device, a QR scanner, and so on.

In some examples, the input device 112 can include one or more of a Bluetooth® communication device, a NFC communication device, and so on configured to receive the customer information from a mobile wallet application executed by a customer device (not shown) of the customer 101. The mobile wallet client is structured to provide the customer information to the input device 112 (e.g., by presenting a payment code on a display of the customer device, by transmitting payment account information via Bluetooth® or NFC transmission to the input device 112, etc.). In some arrangements, the mobile wallet client can be any of Apple® Pay, Android® Pay, Samsung® Pay, Wells Fargo® Wallet, or the like.

In some examples, the input device 112 includes one or more of a keypad, a keyboard, a touchscreen, or another suitable user input device that allows the customer 101 to physically input customer information (e.g., the PAN, the MTN, a model number of a mobile device of the customer 101, passport number, social security number, driver license number, and so on) during a transaction.

In the examples in which the device 110 is an eCommerce host, the device 110 can be used to receive the customer information for an online transaction of the customer 101. For example, the customer 101 can access the online shopping website associated with the merchant via a customer device (not shown) and can provide the customer information through a checkout feature of the online shopping website. In other examples, the mobile wallet client of the customer device can also be used to make online transactions. In some arrangements, the customer information includes a PAN, an EMV® token, a MTN, and so on. The customer 101 can input the customer information, for example, into the customer device by the typing the customer information in or by transmitting the customer information from the payment card to the customer device. The device 110 can receive the customer information from the online shopping website, e.g., via a network device 120. In an alternate arrangement, the customer information can be provided via transmission from the mobile wallet client of the customer device to the eCommerce host (e.g., to the input device 112). In a further arrangement, the customer information can be provided over the phone to a representative of the merchant and associated with a transaction facilitated with the device 110.

In some arrangements, the input device 112 includes communication circuitry for facilitating the exchange of data, values, messages, and the like between the input device 112 and the components (e.g., the processing circuit 114, the network device 120, a loyalty account identifier circuit 122, and so on) of the device 110. In some arrangements, the input device 112 includes machine-readable media for facilitating the exchange of information between the input device 112 and the components of the device 110.

The device 110 includes a processing circuit 114 having a processor 116 and a memory 118. The processor 116 can be implemented as a general-purpose processor, an Application Specific Integrated Circuit (ASIC), one or more Field Programmable Gate Arrays (FPGAs), a Digital Signal Processor (DSP), a group of processing components, or other suitable electronic processing components. The memory 118 (e.g., Random Access Memory (RAM), Read-Only Memory (ROM), Non-volatile RAM (NVRAM), flash memory, hard disk storage, etc.) stores data and/or computer code for facilitating at least some of the various processes described herein. The memory 118 includes tangible, non-transient volatile memory, or non-volatile memory. The memory 118 can include a non-transitory processor readable medium having stores programming logic that, when executed by the processor 116, controls the operations of the device 110.

The network device 120 is structured for sending and receiving data over the network 130 (e.g., to and from the backend system 140 and one or more other suitable devices). Accordingly, the network device 120 includes any of a cellular transceiver (for cellular standards), local wireless network transceiver (for 802.11X, ZigBee, Bluetooth, Wi-Fi, or the like), wired network interface, a combination thereof (e.g., both a cellular transceiver and a Bluetooth transceiver), and/or the like.

The loyalty account identifier circuit 122 is configured to cryptographically determine a loyalty account identifier in the manner described. In some examples, the loyalty account identifier circuit 122 is implemented with the processing circuit 114. For example, the loyalty account identifier circuit 122 can be implemented as a software application stored within the memory 118 and executed by the processor 116. Accordingly, such examples can be implemented with minimal or no additional hardware costs. However, other implementations can rely on dedicated hardware specifically configured for performing operations of the loyalty account identifier circuit 122.

The backend system 140 can be a provider institution computing system that provides financial products and services such as, but not limited to, credit card accounts, mobile wallets, checking/savings accounts, retirement accounts, mortgage accounts, loan accounts, investment and financial accounts, and the like to the customer 101. The backend system 140 includes a processing circuit 142 having a processor 144 and a memory 146. The processor 144 is implemented as a general-purpose processor, an ASIC, one or more FPGAs, a DSP, a group of processing components, or other suitable electronic processing components. The memory 146 (e.g., RAM, ROM, NVRAM, flash memory, hard disk storage, etc.) stores data and/or computer code for facilitating at least some of the various processes described herein. The memory 146 includes tangible, non-transient volatile memory, or non-volatile memory. The memory 146 can include a non-transitory processor readable medium having stores programming logic that, when executed by the processor 144, controls the operations of the backend system 140.

As shown, the backend system 140 includes a network device 148. The network device 148 is structured for sending and receiving data over the network 130 (e.g., to and from the device 110, etc.). Accordingly, the network device 148 includes any of a cellular transceiver (for cellular standards), local wireless network transceiver (for 802.11X, ZigBee, Bluetooth®, Wi-Fi, or the like), wired network interface, a combination thereof (e.g., both a cellular transceiver and a Bluetooth transceiver), and/or the like.

The backend system 140 includes an account database 150 that stores customer information and account information relating to accounts held by customers (including the customer 101) with a financial institution. The financial institution uses the backend system 140 to provide financial products and services to the customers. One or more entries in the account database 150 that correspond to the customer 101 include information such as but not limited to, a customer name, a customer address, one or more PANs that each identifies a financial account (e.g., credit card account, debit card account, and so on) of the customer 101, and other information of the customer 101. In some examples, the account database 150 stores transaction history of transactions made by the customer 101 using the one or more financial accounts of the customer 101.

The backend system 140 can include a mobile wallet account database 152 for storing mobile wallet accounts of customers (including the customer 101). The mobile wallet accounts permit payments via a mobile wallet client application of the customer device. The mobile wallet account database 152 stores transaction history of transactions made by the customer 101 using the mobile wallet client application.

The backend system 140 can include a loyalty account database 154 for storing loyalty account information of customers (including the customer 101). For example, the loyalty account database 154 stores information such as but not limited to, loyalty account identifiers that each identifies a loyalty account, an amount of points in each loyalty account, and so on.

The backend system 140 can include a loyalty account identifier circuit 156 that is configured to cryptographically determine a loyalty account identifier in the manner described. As described, in some arrangements, the loyalty account identifier circuit 122 is configured to determine the loyalty account identifier while in other arrangements, the loyalty account identifier circuit 156 is configured to determine the loyalty account identifier, instead. The loyalty account identifier circuit 156 can be implemented with the processing circuit 142. For example, the loyalty account identifier circuit 156 can be implemented as a software application stored within the memory 146 and executed by the processor 144. Accordingly, such examples can be implemented with minimal or no additional hardware costs. However, other implementations can rely on dedicated hardware specifically configured for performing operations of the loyalty account identifier circuit 156.

Figure 2:
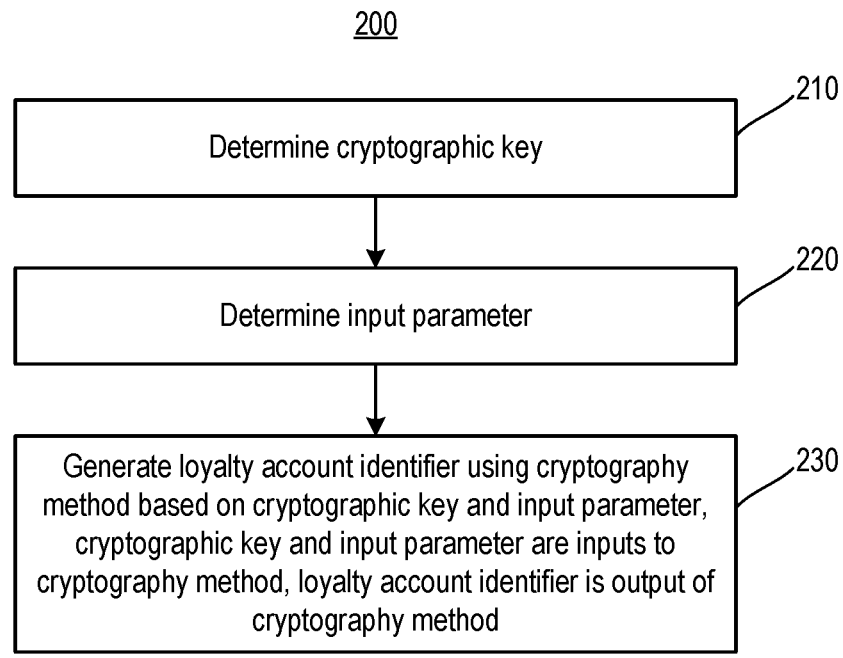
FIG. 2 is a flow diagram illustrating a method for cryptographically determining a loyalty account identifier, according to various arrangements.

FIG. 2 is a flow diagram illustrating a method 200 for cryptographically determining a loyalty account identifier, according to various arrangements. Referring to FIGS. 1-2, the method 200 is concerned with generating a loyalty account identifier for a transaction (e.g., an electronic transaction) using a cryptographic key and an input parameter. The input parameter (or a plurality of input parameters) can be generated based on one or more of a random number, a PAN, a MTN, an EMV® token, and so on. The cryptographic key and the input parameter are used as inputs to a cryptography method, which outputs the loyalty account identifier based on the cryptographic key and the input parameter. Given that the input parameter is generated based on sensitive customer information (such as but not limited to the PAN, the MTN, and the EMV®), obfuscating such customer information to generate the loyalty account identifier protects the customer information given that the loyalty account identifier (and not the underlying customer information) is being stored and transmitted. In other words, determination of the input parameter(s) involves transformations of the customer information. Such transformation can be a value of a type AlgorithmIdentifier with an OID (for naming) and an associated type of OCTET STRING (which includes the input parameter generated based on the function). A set of such objects can be used as a constraint on values of type AlgorithmIdentifier. Some organizations/enterprises that desire interoperability can publish the OID; other organizations/enterprises that would like to keep the obfuscation method proprietary can simply not registered the complete OID but use an arc related to corresponding organizational identifier and loyalty ID while keeping the rest of the information unpublished.

At 210, the loyalty account identifier circuit 122 is configured to determine a cryptographic key K. In some examples, the cryptographic key K is a loyalty-dedicated key that is dedicated for generating the loyalty account identifier by the device 110. The cryptographic key K can be stored by the memory 118 or another suitable secure key store (not shown) of the device 110. In this case, the loyalty account identifier circuit 122 is configured to retrieve the cryptographic key K from the memory 118 or the secure key store. In some examples, the cryptographic key K is derived from a base key BK using an XOR function with any suitable identifier ID (e.g., BK xor ID), PKCS #5 PBDKF2, and so on. In other examples, the cryptographic key K is received by the device 110 from a third-party key provider (e.g., a secure key store, a key service provider, and so on) via the network 130. The device 110 can send information to the third-party key provider. In response to receiving the information, the third-party key provider can send the cryptographic key K to the device 110 via the network 130. Examples of the information sent to the third-party key provider include but are not limited to, an identifier of the device 110, customer information (e.g., the PAN, the MTN, the EMV®, and so on), and so on. The third-party key provider can be located at the backend system 140 or at another suitable system connected to the device 110 via the network 130.

At 220, the loyalty account identifier circuit 122 is configured to determine an input parameter for the cryptography method. The input parameter can be a random number R or a result of a function. An example of the function is the XOR function, which can be used to create a unique value from two other unique values. Other examples of the function include but are not limited to, a one-way function (e.g., any cryptographic hash function), a concatenation function (e.g., X∥Y), an addition function (e.g., X+Y), a multiplication function (e.g., X×Y), and so on. The inputs to the function include a salt (e.g., the random number R) and one type or a combination of types of customer information (e.g., one or a combination of the PAN, the MTN, the EMV®, and so on). In one example, the input parameter is the result of R xor PAN. In one example, the input parameter is the result of R xor MTN. In one example, the input parameter is the result of R xor EMV. In one example, the input parameter is the result of R xor PAN xor MTN or other suitable input combinations. In one example, the input parameter is the result of R∥PAN. In one example, the input parameter is the result of R+PAN. In one example, the input parameter is the result of R×PAN. The inputs to the function can be a numeric value, a character string (e.g., a binary string), and so n.

The customer information (e.g., the PAN, the MTN, the EMV®, and so on) used to determine the input parameter can be obtained by the device 110 in connection with a transaction between a merchant and the customer 101 in the manner described. In the examples in which the device 110 is a merchant POS terminal, the customer information can be received using the input device 112. In the examples in which the device 110 is an eCommerce host, the device 110 can receive the customer information in connection with an online transaction of the customer 101. In other words, block 220 can be executed in response to the transaction being initiated (e.g., in response to the device 110 obtaining the customer information used to determine the input parameter). As such, the loyalty account identifiers can be generated in real-time in connection with the transaction. Accordingly, the customer information (e.g., the PAN, the MTN, the EMV®, and so on) are obfuscated using the function and the salt (the random number R).

At 230, the loyalty account identifier circuit 122 is configured to generate the loyalty account identifier using a cryptography method based on the cryptographic key K and the input parameter. Block 230 can be executed in response to determining the input parameter at block 220. The cryptographic key K and the input parameter are inputs to the cryptography method. The loyalty account identifier is an output of the cryptography method. Examples of the cryptography method include but are not limited to, a HMAC function (which implements any hash algorithms such as but not limited to, SHA1, SHA-256, SHA-512, and so on), a MAC (which performs encryption using cipher block chaining (CBC)).

In some implementations, the loyalty account identifier can include any number of primary loyalty account number(s), any number of secondary loyalty account number(s), and any number of tertiary loyalty account number(s). A primary loyalty account number is generated using an input parameter that is determined based on information that excludes the sensitive customer information (such as but not limited to, the PAN, the MTN, the EMV®, and so on). For example, the primary loyalty account number can be generated using the random number R in the manner described. A secondary loyalty account number is generated using an input parameter that is determined based on one type of customer information (e.g., one of the PAN, the MTN, the EMV®, and so on). A tertiary loyalty account number is generated using an input parameter that is determined based on two or more types of customer information (e.g., two or more of the PAN, the MTN, the EMV®, and so on).

In some examples, the generated loyalty account identifier includes a primary loyalty account number B. The primary loyalty account number B can be created using the random number R as the input parameter into the cryptography method (e.g., an HMAC function) with the cryptographic key K, for example, using expression (1):

$$B=\mathrm{HMAC}(K,R) \qquad (1).$$

In some examples, the generated loyalty account identifier includes a secondary PAN-based loyalty account number S1PAN that correlates with the PAN. The secondary PAN-based loyalty account number S1PAN can be created using the cryptographic key K and the input parameter (e.g., the random number R in an XOR function with a PAN) as inputs to the cryptography method (e.g., an HMAC function), for example, using expression (2):

$$S1\mathrm{PAN}=\mathrm{HMAC}(K,(R\ \mathrm{xor}\ \mathrm{PAN})) \qquad (2).$$

In some examples, the generated loyalty account identifier includes a secondary MTN-based loyalty account number S2MTN that correlates with the MTN. The secondary MTN-based loyalty account number S2MTN can be created using the cryptographic key K and the input parameter (e.g., the random number R in an XOR function with a MTN) as inputs to the cryptography method (e.g., an HMAC function), for example, using expression (3):

$$S2\mathrm{MTN}=\mathrm{HMAC}\ (K,(R\ \mathrm{xor}\ \mathrm{MTN})) \qquad (3).$$

In some examples, the generated loyalty account identifier includes a secondary EMV-based loyalty account number S3EMV that correlates with the EMV® token. The secondary EMV-based loyalty account number S3EMV can be created using the cryptographic key K and input parameter (e.g., the random number R in an XOR function with the EMV® token EMV issued by a brand-sponsored token service provider (TSP)) as inputs to the cryptography method (e.g., an HMAC function), for example, using expression (4):

$$S3\mathrm{EMV}=\mathrm{HMAC}(K,(R\ \mathrm{xor}\ \mathrm{EMV})) \qquad (4).$$

In some examples, the generated loyalty account identifier includes a tertiary combined loyalty account number T1. The tertiary combined loyalty account number T1 can be created using the cryptographic key K and the input parameter (e.g., R xor PAN xor MTN) as inputs to the cryptography method (e.g., an HMAC function), for example, using expression (5):

$$T1=\mathrm{HMAC}(K,(R\ \mathrm{xor}\ \mathrm{PAN}\ \mathrm{xor}\ \mathrm{MTN})) \qquad (5).$$

After the loyalty account identifier is generated, the loyalty account identifier is transmitted via the network 130 to the backend system 140, to be stored in the loyalty account database 154. The loyalty account identifier (instead of cleartext customer information such as cleartext PAN or cleartext MTN) is being transmitted via the network 130 and stored in the loyalty account database 154. Thus, if (when) the loyalty account identifier is compromised during transmission or storage, as long as the loyalty-dedicated cryptographic key K is protected securely (e.g., in the HMAC), the loyalty account identifier (e.g., B, S1PAN, S2MTN, S3EMV, T1, and so on) is obfuscated and does not mean anything.

Alternatively, instead of the device 110 determining the loyalty account identifier based on the method 200, the loyalty account identifier circuit 156 of the backend system 140 can also implement the method 200. For example, the loyalty account identifier circuit 156 determines the cryptographic key K by retrieving the cryptographic key K from the memory 146 or a secure key store (not shown) of the backend system 140 or by receiving the cryptographic key K from a third-party key provider via the network 130 in the manner described, at 210. The loyalty account identifier circuit 156 is configured to determine an input parameter for the cryptography method. The customer information used to determine the input parameter can be obtained by the device 110 in connection with a transaction of the customer 101 in the manner described, at 220. The customer information can be transmitted by the device 110 to the backend system 140 over the network 130 in real-time or in batches (periodically). The loyalty account identifier circuit 156 can determine the loyalty account identifier using the cryptography method based on the cryptographic key and the input parameter in the manner described, at 230.

While the PAN, the MTN, and the EMV® are used as examples of customer information, other types of obtainable customer information can be likewise used to determine the loyalty account identifier in the manner described. Additional examples of the customer information include but are not limited to, a serial number of the device 110, a model number of the device 110, a vehicle identification number (VIN) of a car, a public key of the device 110, a serial number of the public key, a biometric template reference number of biometrics of the customer 110, a passport number of the customer 110, a social security number of the customer 110, a driver license number of the customer 110, and so on. Such customer information can be collected by the device 110 or the backend system 140 in any suitable manner. Whereas the HMAC function is used as an example of the cryptography method in expressions (1)-(5), the MAC function or another suitable cryptography method can be likewise implemented.

Figure 3:
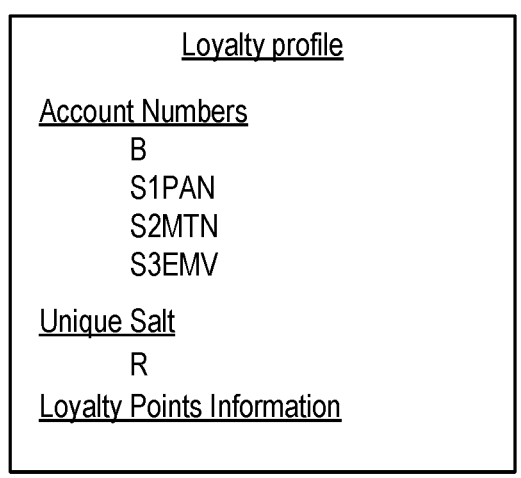
FIG. 3 is a diagram illustrating loyalty account identifiers of a customer, according to various arrangements.

FIG. 3 is a diagram illustrating loyalty account identifiers of a customer, according to various arrangements. Referring to FIGS. 1-3, FIG. 3 depicts a loyalty profile 300 of the customer 101. The loyalty profile 300 can be stored in the loyalty account database 154 and can be customer-specific. As shown, the loyalty profile 300 includes loyalty account identifiers, such as the primary loyalty account number B (determined using the expression (1)), the secondary PAN-based loyalty account number S1PAN (determined using the expression (2)), the secondary MTN-based loyalty account number S2MTN (determined using the expression (3)), the secondary EMV-based loyalty account number S3EMV (determined using the expression (4)), and tertiary combined loyalty account number T1 (determined using the expression (5)). Each of the loyalty account identifiers in the loyalty profile 300 is generated using the method 200. Thus, the loyalty account member (e.g., the customer 101) is allocated a basic loyalty account number, three secondary account numbers, and a tertiary combined loyalty account number. The types of loyalty account identifiers and the number of loyalty account identifiers can be dependent on which type of customer information is available. For example, secondary account numbers and tertiary combined loyalty account numbers can be generated based on customer information (e.g., the PAN, the MTN, the EMV® token) that is available. In other words, if the customer information is obtained during the underlying customer transaction by the device 110, the obtained customer information can be obfuscated to generate the loyalty account identifiers in the manner described.

In some examples, the loyalty profile 300 includes the unique salt (e.g., the random number R), the various account numbers (e.g., B, S1PAN, S2MTN, S3EMV, T1, and so on), and the loyalty points information (e.g., pending loyalty points, current loyalty points, aging loyalty points, and so on). Therefore, regardless of which one(s) of the identifiers is associated with a loyalty points transaction, the identifier(s) and salt can be used to determine one of the account numbers. In some arrangements, the loyalty profile 300 further includes payment accounts (e.g., those in the account database 150 and the mobile wallet database 152) associated with the loyalty account identifiers.

The method 200 for determining the loyalty account identifiers can be implemented with respect to messaging formats and interface processes via a common loyalty program API.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may comprise or otherwise share the same processor which, in some example arrangements, may execute instructions stored, or otherwise accessed, via different areas of memory). Alternatively or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims.

What is claimed is:

1. A method for cryptographically determining a loyalty account identifier, comprising:
    determining, by a processing circuit of a device, a cryptographic key based on an XOR function that takes as inputs a base key and a number;
    determining, by the processing circuit, a first input parameter based on at least a token;
    generating, by the processing circuit, the loyalty account identifier using a first cryptography method based on the cryptographic key and the first input parameter, wherein the cryptographic key and the first input parameter are inputs to the first cryptography method, and the loyalty account identifier is an output of the first cryptography method; and
    generating, by the processing circuit at least one loyalty account number created using the number as a second input parameter into a second cryptographic method;
    wherein the loyalty account identifier comprises at least one loyalty account number.

2. The method of claim 1, wherein the cryptography method comprises a keyed-hash message authentication code (HMAC) function or a message authentication code (MAC).

3. The method of claim 1, wherein determining the cryptographic key comprises retrieving the cryptographic key from a secure storage of the device.

4. The method of claim 1, wherein determining the cryptographic key comprises receiving, over a network, the cryptographic key from a secure storage.

5. The method of claim 1, wherein determining the cryptographic key comprises deriving the cryptographic key from a base key.

6. The method of claim 1, wherein the input parameter is a random number.

7. The method of claim 1, wherein the input parameter is determined based on a primary account number (PAN).

8. The method of claim 7, wherein determining the input parameter comprises generating the input parameter as an output of a function, wherein the PAN and a random number are inputs to the function.

9. The method of claim 8, wherein the function is an XOR function, a concatenation function, an addition function, or a multiplication function.

10. The method of claim 1, wherein the input parameter is determined based on a mobile telephone number (MTN).

11. The method of claim 10, wherein determining the input parameter comprises generating the input parameter as an output of a function, wherein the MTN and a random number are inputs to the function.

12. The method of claim 11, wherein the function is an XOR function.

13. The method of claim 1, wherein the input parameter is determined based on a Europay, Mastercard and Visa" (EMV®) token.

14. The method of claim 13, wherein determining the input parameter comprises generating the input parameter as an output of a function, wherein the EMV® token and a random number are inputs to the function.

15. The method of claim 14, wherein the function is an XOR function.

16. The method of claim 1, wherein the input parameter is determined based on a primary account number (PAN) and a mobile telephone number (MTN).

17. The method of claim 16, wherein determining the input parameter comprises generating the input parameter as an output of a function, wherein the PAN, the MTN, and a random number are inputs to the function.

18. The method of claim 17, wherein the function is an XOR function.

19. The method of claim 1, wherein the loyalty account identifier is generated in response to determining the input parameter.

20. A device configured for cryptographically determining a loyalty account identifier, comprising:
a processing circuit comprising a processor and a memory, wherein the processing circuit is configured to:
determine a cryptographic key based on an XOR function that takes as inputs a base key and a number;
determine a first input parameter based on at least a token;
generate the loyalty account identifier using a first cryptography method based on the first cryptographic key and the first input parameter, wherein the cryptographic key and the first input parameter are inputs to the first cryptography method, and the loyalty account identifier is an output of the first cryptography method; and
generate at least one loyalty account number created using the number as a second input parameter into a second cryptographic method;
wherein the loyalty account identifier comprises at least one loyalty account number.

21. A non-transitory computer-readable medium of a device storing computer-readable instructions such that, when executed, causes a processor of the device to:
determine a cryptographic key based on an XOR function that takes as inputs a base key and a number;
determine a first input parameter based on at least a token;
generate a loyalty account identifier using a first cryptography method based on the cryptographic key and the first input parameter, wherein the cryptographic key and the first input parameter are inputs to the first cryptography method, and the loyalty account identifier is an output of the first cryptography method; and
generate at least one loyalty account number created using the number as a second input parameter into a second cryptographic method;
wherein the loyalty account identifier comprises at least one loyalty account number.

* * * * *